United States Patent
Kojima

(10) Patent No.: US 8,897,123 B2
(45) Date of Patent: Nov. 25, 2014

(54) RADIO COMMUNICATION TERMINAL, BASE STATION, RADIO COMMUNICATION METHOD AND RADIO COMMUNICATION SYSTEM

(75) Inventor: Masaya Kojima, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 346 days.

(21) Appl. No.: 13/321,917

(22) PCT Filed: May 26, 2010

(86) PCT No.: PCT/JP2010/003543
§ 371 (c)(1),
(2), (4) Date: Nov. 22, 2011

(87) PCT Pub. No.: WO2010/137318
PCT Pub. Date: Dec. 2, 2010

(65) Prior Publication Data
US 2012/0076101 A1  Mar. 29, 2012

(30) Foreign Application Priority Data

May 26, 2009  (JP) .................................. 2009-126606

(51) Int. Cl.
| | |
|---|---|
| H04J 11/00 | (2006.01) |
| H04W 4/00 | (2009.01) |
| H04K 1/10 | (2006.01) |
| H04L 5/00 | (2006.01) |
| H04W 72/04 | (2009.01) |

(52) U.S. Cl.
CPC ......... H04L 5/0048 (2013.01); H04W 72/0453 (2013.01)
USPC ........... 370/208; 370/328; 370/335; 370/342; 375/260

(58) Field of Classification Search
CPC ..................... H04L 5/0048; H04W 72/0453
See application file for complete search history.

(56) References Cited

U.S. PATENT DOCUMENTS 5,987,012 A * 11/1999 Bruckert et al. ............... 370/331
6,131,016 A * 10/2000 Greenstein et al. ............. 455/69
(Continued)

FOREIGN PATENT DOCUMENTS

JP  2007150971 A  6/2007
JP  2007-174652 A  7/2007
(Continued)

OTHER PUBLICATIONS

Japanese Office Action "Notification of Reason for Refusal" dated Feb. 19, 2013, which corresponds to Japanese Patent Application No. 2011-515896 and is related to U.S. Appl. No. 13/321,917.

(Continued)

Primary Examiner — Melanie Jagannathan
(74) Attorney, Agent, or Firm — Studebaker & Brackett PC

(57) ABSTRACT

A radio communication terminal (100) includes a correction unit (154) configured to correct data signals by using reference signals included in a received frame from a base station (200), a determination unit (140) for determining whether it is possible to have good radio communication with the base station (200) based on a condition of radio communication with the base station (200), a transmission frame generation unit (110), upon determination that it is possible to perform good radio communication, for generating a transmission frame with a reduced number of reference signals as a notification signal, and a transmission unit (120) for transmitting the notification signal to the base station (200). The correction unit (154) corrects the data signal by using the reference signals included in the received frame in which at least one reference signal is replaced with the data signal, from the base station (200) corresponding to the notification signal.

4 Claims, 15 Drawing Sheets

(56) References Cited

U.S. PATENT DOCUMENTS

| | | |
|---|---|---|
| 7,710,910 B2 | 5/2010 | Ode et al. |
| 2006/0281462 A1* | 12/2006 | Kim et al. ............. 455/436 |
| 2007/0121538 A1* | 5/2007 | Ode et al. ............. 370/323 |
| 2007/0149249 A1* | 6/2007 | Chen et al. ............. 455/561 |
| 2007/0224995 A1* | 9/2007 | Frederiksen et al. ......... 455/437 |
| 2007/0232238 A1* | 10/2007 | Kawasaki ............. 455/69 |
| 2008/0123762 A1* | 5/2008 | Mizusawa ............. 375/260 |
| 2008/0227475 A1* | 9/2008 | Suemitsu et al. ............. 455/513 |
| 2009/0175370 A1* | 7/2009 | Kuroda et al. ............. 375/260 |
| 2010/0172373 A1 | 7/2010 | Kimura et al. |
| 2011/0244905 A1* | 10/2011 | Burstrom et al. ............. 455/507 |

FOREIGN PATENT DOCUMENTS

| | | |
|---|---|---|
| WO | 2007/125889 A1 | 11/2007 |
| WO | 2009/028095 A1 | 3/2009 |

OTHER PUBLICATIONS

International Search Report; PCT/JP2010/003543; Jun. 22, 2010.

* cited by examiner

RADIO COMMUNICATION TERMINAL, BASE STATION, RADIO COMMUNICATION METHOD AND RADIO COMMUNICATION SYSTEM

CROSS REFERENCE TO RELATED APPLICATION

This application claims priority to and the benefit of Japanese Patent Application No. 2009-126606 filed on May 26, 2009, the entire contents of which are incorporated herein by reference.

TECHNICAL FIELD

The present invention relates to radio communication terminals, base stations, radio communication methods and radio communication systems employing Orthogonal Frequency Division Multiple Access (OFDMA).

BACKGROUND ART

When a wide area base station (macrocell) installed outdoors and a radio communication terminal (mobile station) perform radio communication each other, fading is often caused by buildings and movement of the radio communication terminal, leading to significant slowdown in a communication speed. In addition, in a radio communication system of OFDMA scheme which has been recently employed by WiMAX (Worldwide Interoperability for Microwave Access), UMB (Ultra Mobile Broadband), LTE (Long Term Evolution) and next-generation PHS, different frequency channels (subchannels) are allocated to different users (radio communication terminals) to perform communication. In such a radio communication system, a reception level and CINR (Carrier to Interference and Noise Ratio) are deteriorated for some frequencies allocated, as affected by multipath.

In order to address such a problem, in WiMAX and LTE adopting OFDMA, a transmitter transmits a frame in which reference signals (pilot subcarriers) are inserted based on a predetermined regulation. Then, a receiver calculates a correction value based on the reference signals included in the frame received and multiplies data signals, except the reference signals, by the correction value. A method to reduce influence by fading, such as data signal (data subcarrier) amplitude and phase distortion, in the above manner has been employed. The reference signal is also used in a multi-antenna system (AAS: Adaptive Array System, MIMO: Multi Input Multi Output) for the receiver side to identify an antenna on the transmitter side which sent the reference signal.

As a conventional communication technology adopting OFDMA scheme, there has been one disclosed, which enables to support as many number of users and/or antennas as possible by dynamically changing the number of pilot symbols and the number of groups of the pilot subcarriers among different users, based on the number of simultaneously supportable users and antennas and a precision requirement in radio channel estimation (for example, see Patent Document 1).

PRIOR ART DOCUMENT

Patent Document
JP 2007-174652 A

SUMMARY OF INVENTION

Technical Problem

In conventional systems, such as WiMAX, for example, it is standardized to arrange the pilot subcarriers, reference signals, at predetermined intervals.

In addition, current WiMAX and LTE assume service deployment with the wide area base station installed outdoors. Since multipath is caused outdoors, if the number of the pilot subcarriers is decreased, fluctuation of the phase and the amplitude of received signals cannot be corrected, thus possibly reducing throughput of an entire base station. In contrast, having too many pilot subcarriers increases a processing load as the receiver side corrects a frequency response in accordance with the pilot subcarriers, thus resulting in increase in power consumption and deceleration in a processing speed. Further, under a good radio communication condition, that is, under a good propagation environment between the radio communication terminal and the base station, it is unlikely to deteriorate the received signals and thus not necessary to correct them. In such a case, carrying out correction processing using the pilot subcarriers received generates an excessive processing load. The above problems are unfavorable for the radio communication terminals, for which power saving has been promoted.

Accordingly, an object of the present invention is to provide a radio communication terminal, a base station, and a method and a system of a radio communication adopting OFDMA scheme that are capable of solving the above problems and reducing, in particular, the processing load of the radio communication terminal under a good propagation environment as well as improving throughput of entire radio communication.

Solution to Problem

In order to solve the above problems, according to an embodiment of the present invention, a radio communication terminal for performing radio communication with a base station by adopting Orthogonal Frequency Division Multiple Access scheme using a frame including data signals and reference signals used for correction of the data signals, includes:

a determination unit configured to determine whether it is possible to perform good radio communication with the base station;

a transmission unit configured to transmit a notification signal for reducing the number of reference signals to the base station if the determination unit determines that it is possible to perform good radio communication; and a correction unit configured to correct the data signals included in a received frame from the base station by using the reference signals included in the received frame.

The radio communication terminal according to one embodiment of the present invention is characterized in that the determination unit determines whether it is possible to perform good radio communication with the base station based on a state of radio communication with the base station.

The radio communication terminal according to another embodiment of the present invention is characterized in that the determination unit determines whether it is possible to perform good radio communication with the base station based on a type of the base station.

The radio communication terminal according to yet another embodiment of the present invention is characterized in that the determination unit determines the number of reference signals based on a state of the radio communication with the base station.

The radio communication terminal according to yet another embodiment of the present invention is characterized in that the notification signal is a transmission frame in which a predetermined reference signal is replaced with a null signal.

According to another embodiment of the present invention, a base station for performing radio communication with a base station by adopting Orthogonal Frequency Division Multiple Access scheme using a frame including data signals and reference signals used for correction of the data signals, includes:

a transmission frame generation unit configured to generate, if a notification signal for reducing number of reference signals is received, a transmission frame including a reduced number of reference signals; and a transmission unit configured to transmit the transmission frame generated by the transmission frame generation unit.

The base station according to another embodiment of the present invention is characterized in that the transmission frame generation unit replaces the reduced number of reference signals with the data signals.

Although devices are described above as solutions according to the present invention, it will be appreciated that the present invention may also be implemented as systems, methods, programs and storage media for storing programs that are substantially corresponding to such devices, and hence they are considered to fall within the scope of the present invention. Each step of the methods and programs uses an arithmetic processing unit such as a CPU (Central Processing Unit), a DSP (Digital Signal Processor) or the like in processing data as necessary, while storing input data and processed or generated data in a storage device such as an HDD (Hard Disk Drive), a memory or the like.

For example, according to another embodiment of the present invention, a radio communication system implementing the present invention has a radio communication terminal and a base station.

According to another embodiment of the present invention, a radio communication method for a radio communication terminal to perform radio communication by adopting Orthogonal Frequency Division Multiple Access scheme using a frame including data signals and reference signals used for correction of the data signals, including the steps of:

correcting the data signals included in a received frame from the base station by using the reference signals included in the received frame;

determining whether it is possible to perform good radio communication with the base station based on information included in the received frame;

generating a transmission frame having a reduced number of reference signals if it is determined that it is possible to perform good radio communication with the base station at the step of determining; and transmitting the transmission frame including the reduced number of reference signals generated at the step of generating as a notification signal to the base station, wherein at the step of correcting, the data signals are corrected by using the reference signals included in the received frame in which at least one reference signal is replaced with a data signal by the base station in response to the notification signal.

According to another embodiment of the present invention, a radio communication method for a base station to perform radio communication by adopting Orthogonal Frequency Division Multiple Access scheme using a frame including data signals and reference signals used for correction of the data signals, including the steps of:

generating a transmission frame in which at least one reference signal is replaced with a data signal if a frame including a reduced number of reference signals is received as a notification signal; and transmitting the transmission frame generated at the step of generating to the radio communication terminal.

Effect of the Invention

According to the present invention, it is possible to provide the radio communication terminal, the base station, and the radio communication method and the radio communication system adopting the Orthogonal Frequency Division Multiple Access scheme that are capable of reducing, in particular, a processing load of the radio communication terminal under a good propagation environment as well as improving throughput of entire radio communication.

DESCRIPTION OF EMBODIMENT

An embodiment of the present invention will be described with reference to the accompanying drawings. Hereinafter, a radio communication system is assumed as a WiMAX system with bandwidth of 10 MHz and 1024 in FFT size. In addition, a base station is assumed as a femtocell which has less fluctuation in a propagation environment and is thus capable of having good radio communication with a radio communication terminal. The femtocell is a small base station installed in, for example, a house or a small office for covering an area in several meters to several tens meters, which is much smaller than an area covered by a conventional base station (wide area base station, macrocell) installed outdoors. The femtocell is connected to a mobile communication network via a public line (broadband network such as ADSL (Asymmetric Digital Subscriber Line)) connected to each house.

Figure 1:
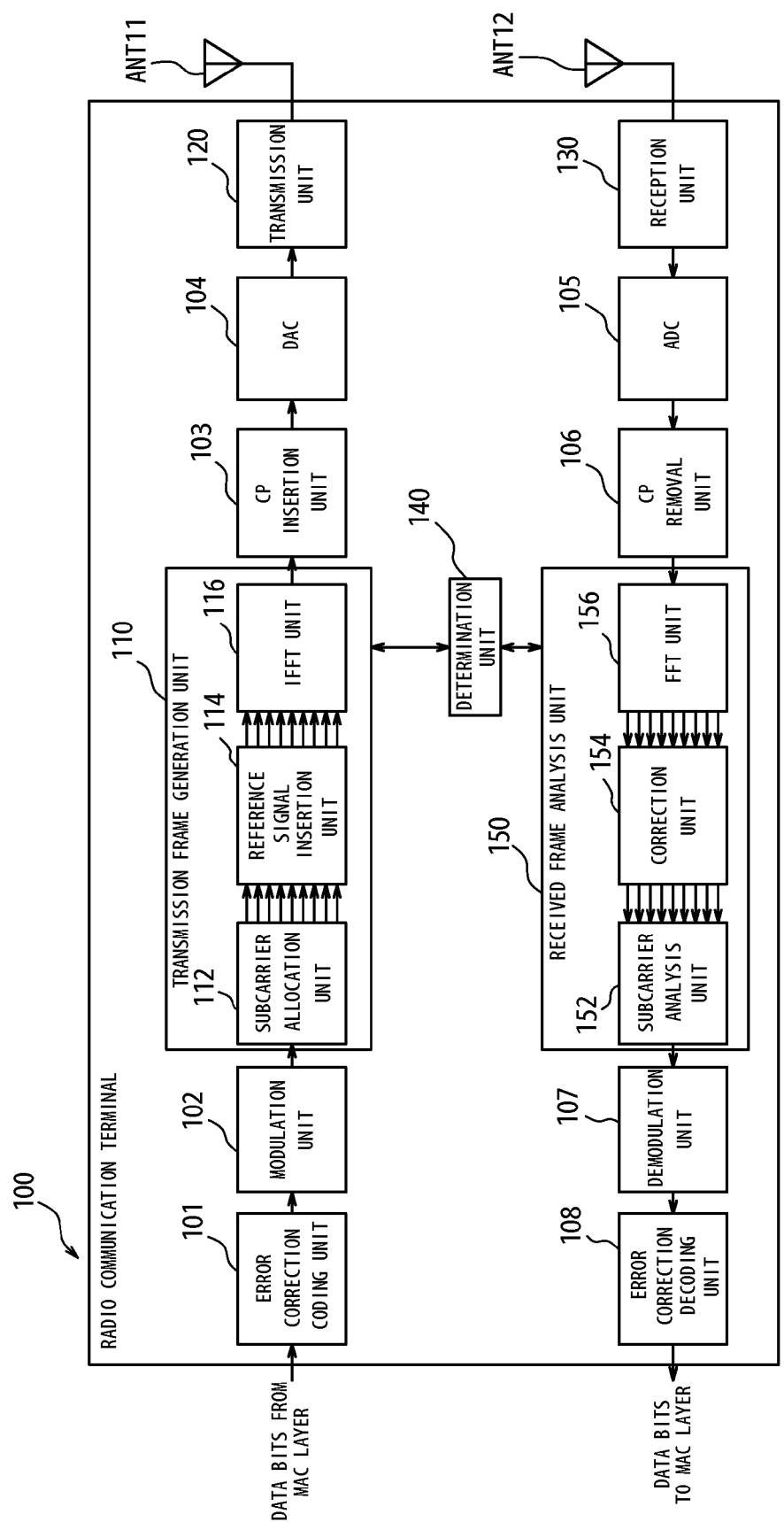
FIG. 1 is a schematic functional block diagram illustrating a radio communication terminal according to one embodiment of the present invention.

FIG. 1 is a schematic functional block diagram illustrating a radio communication terminal according to one embodiment of the present invention. As shown in FIG. 1, a radio communication terminal 100 has a transmission system including an error correction coding unit 101, a modulation unit 102, a transmission frame generation unit 110, a CP (Cyclic Prefix) insertion unit 103, a DAC (Digital to Analog Converter) 104, a transmission unit 120 and a transmission antenna ANT 11. The transmission frame generation unit 110 has a subcarrier allocation unit 112, a reference signal insertion unit 114 and an IFFT (Inverse Fast Fourier Transform) unit 116. In addition, the radio communication terminal 100 has a reception system including a reception antenna ANT 12, a reception unit 130, an ADC (Analog to Digital Converter) 105, a CP removal unit 106, a received frame analysis unit 150, a demodulation unit 107 and an error correction decoding unit 108. The radio communication terminal 100 further includes a determination unit 140. The received frame analysis unit 150 has an FFT (Fast Fourier Transform) unit 156, a correction unit 154 and a subcarrier analysis unit 152.

Figure 2:
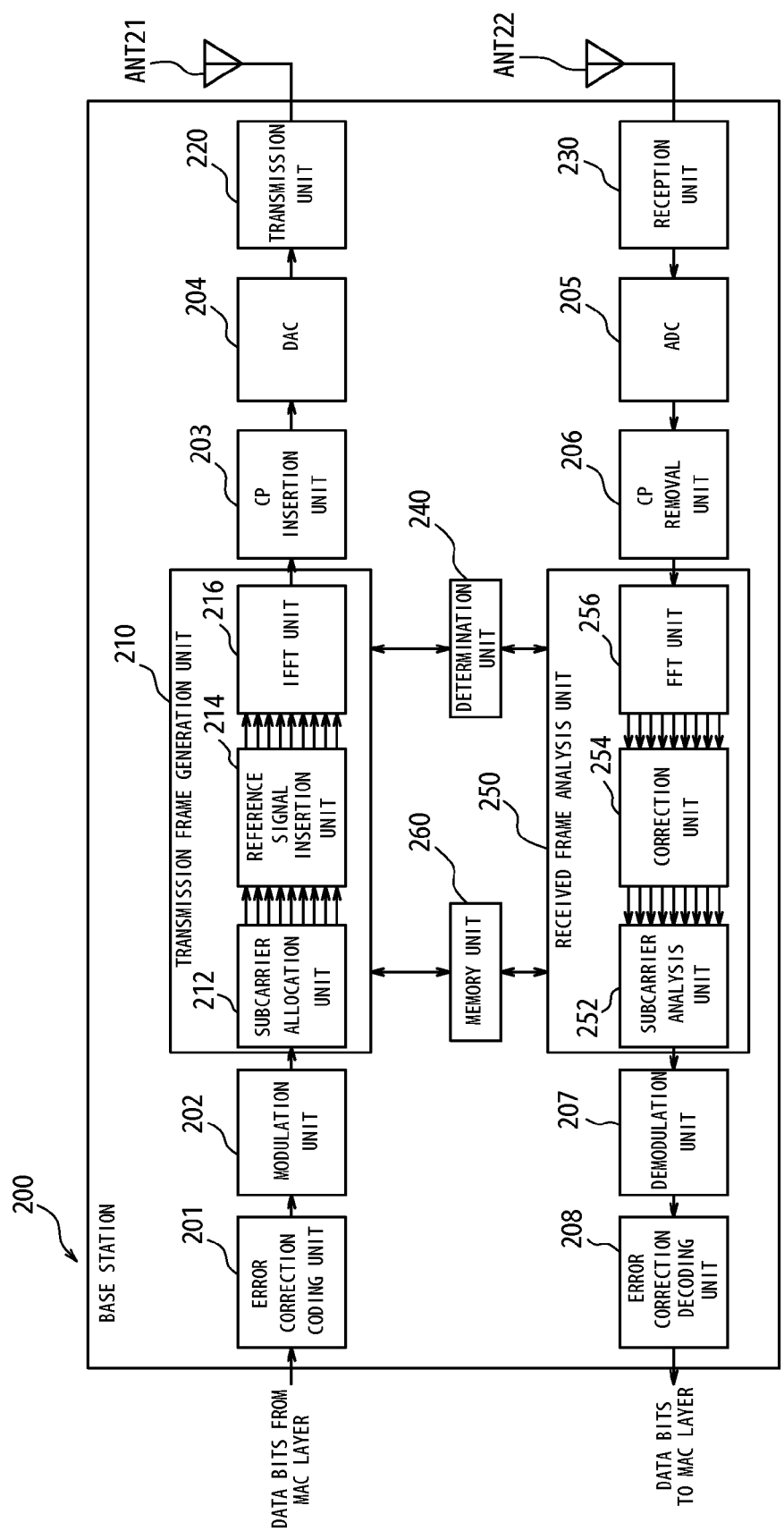
FIG. 2 is a schematic functional block diagram illustrating a base station according to one embodiment of the present invention.

FIG. 2 is a schematic functional block diagram illustrating a base station according to one embodiment of the present invention. As shown in FIG. 2, a base station 200 has a transmission system including an error correction coding unit 201, a modulation unit 202, a transmission frame generation unit 210, a CP insertion unit 203, a DAC (Digital to Analog Converter) 204, a transmission unit 220 and a transmission antenna ANT 21. The transmission frame generation unit 210 has a subcarrier allocation unit 212, a reference signal insertion unit 214 and an IFFT unit 216. In addition, the base station 200 has a reception system including a reception antenna ANT 22, a reception unit 230, an ADC (Analog to Digital Converter) 205, a CP removal unit 206, a received frame analysis unit 250, a demodulation unit 207 and an error correction decoding unit 208. The received frame analysis unit 250 has an FFT unit 256, a correction unit 254 and a subcarrier analysis unit 252. The radio communication terminal 100 further includes a determination unit 240.

Each unit of the radio communication terminal 100 shown in FIG. 1 and that of the base station 200 shown in FIG. 2 functions in much the same manner. Therefore, descriptions of the units are given collectively. First, the transmission system will be described. The error correction coding units 101, 201 perform FEC (Forward Error Correction) on data bits transmitted from a MAC layer. Providing the data with redundancy by FEC on a transmitter side enables a receiver side to detect and correct errors of received data. FEC may be CC (Convolutional Code), CTC (Convolutional Turbo Code) or LDPC (Low Density Parity-check Code), which are implemented by WiMAX and LTE.

The modulation units 102, 202 perform digital multi-level modulation such as QPSK (Quadrature Phase Shift Keying) or QAM (Quadrature Amplitude Modulation) on the data including error correction codes, provided by the error correction coding units 101, 201. It enables to extend a bit length to transmit on one subcarrier. The subcarrier allocation units 112, 212 allocate the data modulated to the subcarriers. In PUSC (Partial Usage of SubChannels), for example, the data are allocated to 720 data subcarriers per symbol. Next, the reference signal insertion units 114, 214 insert pilot subcarriers as the reference signals into an entire frequency range, while inserting DC subcarrier at the center of the frequency range and guard subcarriers on both sides of the frequency range. The IFFT units 116, 216, in order to prevent adjacent subcarriers from interfering with each other, perform IFFT on the subcarriers allocated in the above processing such that each of the subcarriers has orthogonality. The CP insertion units 103, 203 copy ⅛ (Cyclic Prefix) of a rear part of a frame on a time axis formed by IFFT and insert it in the front of the frame. It thereby prevents interference between the symbols caused by delay due to multipath or the like. Then, the DAC units 104, 204 convert a digital signal into an analog signal. The transmission units 110, 220 amplify an analog RF signal and transmit the signals to the receiver side via the transmission antennas ANT 11, ANT 21.

Next, the reception system will be described. The reception units 130, 230 amplify the signal (RF signal) received by the reception antennas ANT 12, ANT 22 by using LNA (Low Noise Amplifier) or the like. The ADC units 105, 205 convert the analog RF signal amplified into the digital signal. The CP removal units 106, 206 remove CP from a received signal. The FFT units 156, 256 perform FFT on the received signal and convert the received signal from a time range into a frequency range. The correction units 154, 254 remove the DC subcarriers and the guard subcarriers from all subcarriers converted into the frequency range. In addition, the correction unit 254 extracts the pilot subcarriers from the received signal and calculates a correction value of a frequency response for each cluster. Then, the correction units 154, 254 correct the data subcarriers in the cluster using the correction value calculated.

The subcarrier analysis unit 252 maps the subcarriers corrected by the correction unit 254 to data sequences. The demodulation units 107, 207 demodulate the data modulated into the digital data, such as QPSK and QAM. The error correction decoding units 108, 208 performs error correction decoding on the demodulated data and then output the data to the MAC layer.

Next, a function specific to the radio communication terminal 100 will be described. As shown in FIG. 1, the radio communication terminal 100 has a determination unit 140. The determination unit 140 determines whether it is possible to perform good radio communication with the base station 200. The determination unit 140 may determine whether it is possible to perform good radio communication with the base station 200 based on a state of the radio communication (for example, based on a determination whether an index value of the state of the radio communication, such as RSSI (Received Signal Strength Indicator) or CINR, satisfies a predetermined threshold). In addition, the determination unit 140 determines whether it is possible to perform good radio communication with the base station 200 based on information included in a received frame from the base station 200. According to the present embodiment, the determination unit 140 determines whether the base station 200 is a femtocell or a macrocell and, if the former, determines that it is possible to perform good radio communication. Accordingly, information used for such determination may be, for example, a cell ID which is an identifier of each base station included in a preamble received from the base station 200. If the macrocell and the femtocell use different frequency range in the radio communication system, the determination unit 140 may determine whether the base station 200 is the femtocell or not based on the frequency received from the base station 200.

If the determination unit 140 determines that the base station 200 is the femtocell, that is, determines that it is possible to perform good radio communication with the base station 200, the transmission frame generation unit 110 of the radio communication terminal 100 generates a transmission frame having a reduced number of pilot subcarriers fewer than a standard number thereof to transmit to the base station 200. That is, the reference signal insertion unit 114 inserts the pilot subcarriers fewer than the standard number into the transmission frame to transmit to the base station. Then, the transmission unit 120 transmits the transmission frame, having the pilot subcarriers fewer than the standard number, as a "notification signal" to the base station 200. If at least one pilot subcarrier is replaced with a data subcarrier, compared to the standard, in the received frame from the base station 200 which has received the notification signal, the correction unit 154 corrects data subcarriers using the pilot subcarriers included in the received frame. That is, it reduces a processing load of correction more than conventional methods, as the radio communication terminal 100 receives the frame having the pilot subcarriers fewer than that in conventional frames and corrects the data subcarriers using only the pilot subcarriers received.

Next, a function specific to the base station 200 will be described. As described above, the radio communication terminal 100 transmits the frame having the pilot subcarriers fewer than the standard number as the "notification signal" to the base station 200. The determination unit 240 of the base station 200 determines whether the radio communication terminal 100 to connect to the base station 200 supports the frame having the pilot subcarriers fewer than the standard number, based on whether the notification signal is received. When the base station 200 receives the notification signal, the transmission frame generation unit 210 generates a transmission frame in which at least one pilot subcarrier is replaced with a data subcarrier, to be transmitted to the radio communication terminal 100 which has transmitted the notification signal. That is, the reference signal insertion unit 214 inserts a data subcarrier where a pilot subcarrier is defined to be inserted by the standard. The transmission unit 220 transmits the transmission frame in which at least one pilot subcarrier among standardized pilot subcarriers is replaced with the data subcarrier. The base station 200 stores in the memory unit 260 the information on the radio communication terminal 100 which has transmitted the notification signal.

Figure 3:
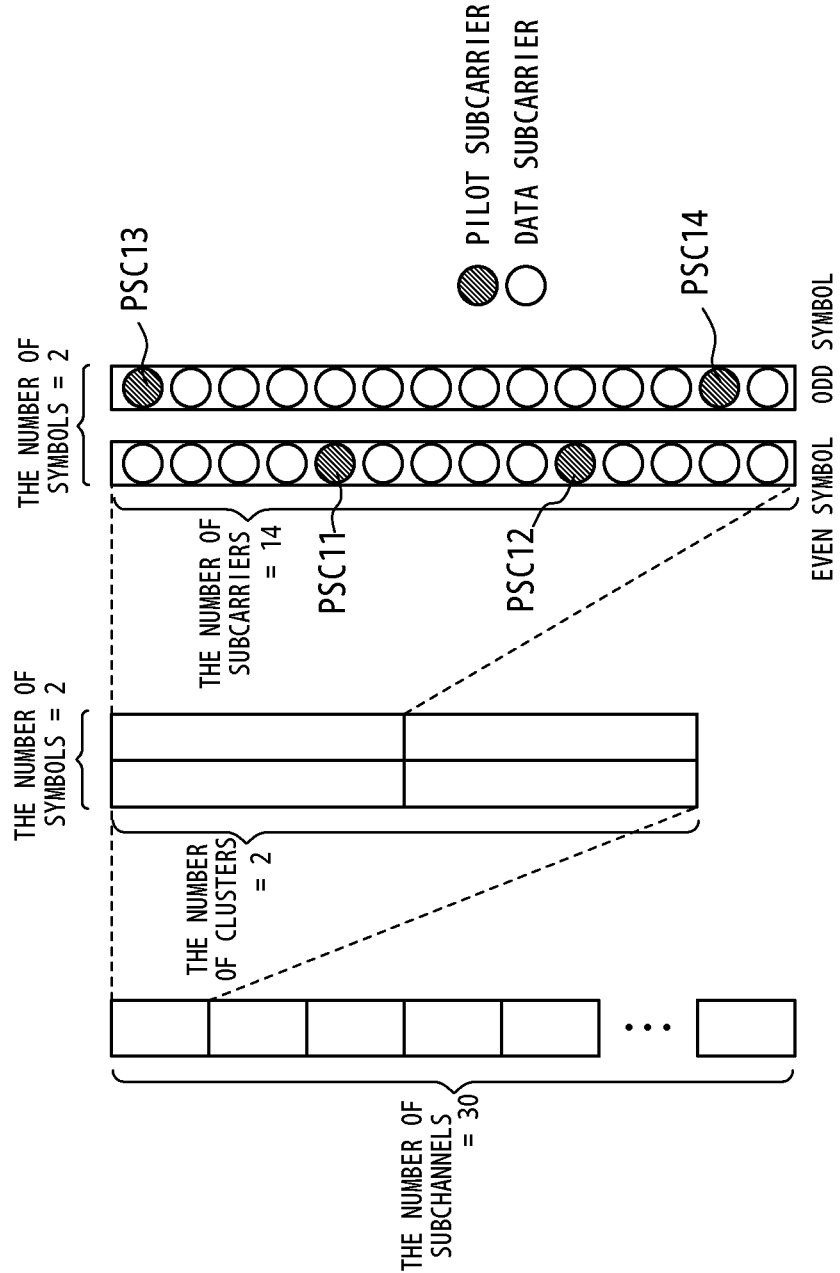
FIG. 3 is a diagram illustrating an arrangement of subchannels, clusters and subcarriers in DL PUSC of WiMAX.
Figure 4:
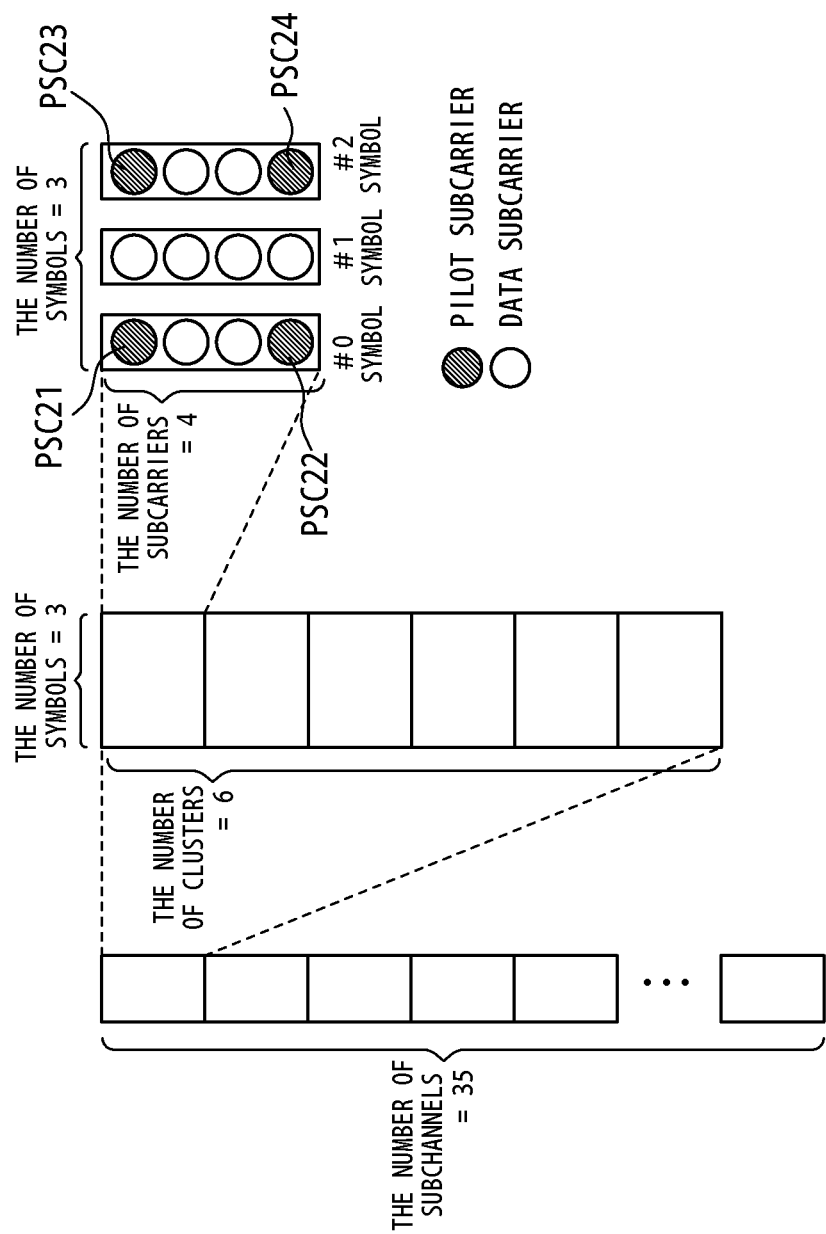
FIG. 4 is a diagram illustrating an arrangement of subchannels, tiles and subcarriers in UL PUSC of WiMAX.

Here, the frame transmitted in the radio communication between the radio communication terminal 100 and the base station 200 will be described with reference to figures. For OFDMA, although there is a plurality of allocation patterns of the pilot subcarriers to the subcarriers, DL PUSC (Down Link Partially Used SubChannelization) is used as an example in this description. FIG. 3 is a diagram illustrating an arrangement of the subchannels, the clusters and the subcarriers according to DL PUSC of WiMAX. As shown in FIG. 3, the frame of DL PUSC consists of thirty subchannels. The subchannel consists of two clusters, each of which includes fourteen subcarriers and two symbol areas. The pilot subcarriers PSC11-PSC14 are arranged at positions as shown in FIG. 3 in all of the clusters in the frame. In addition, FIG. 4 is a diagram illustrating an arrangement of the subchannels, the tiles and the subcarriers according to UL PUSC (Up Link Partially Used SubChannelization) of WiMAX. As shown in FIG. 4, the frame of UL PUSC consists of thirty five subchannels. The subchannel consists of six tiles, each of which includes four subcarriers and three symbol areas. The pilot subcarriers PSC21-PSC24 are arranged at positions shown in FIG. 4 in all of the tiles in the frame.

According to one embodiment of the present invention, when the radio communication terminal 100 and the base station 200 have good propagation environment therebetween, the receiver side reduces the number of the pilot subcarriers to insert into the transmission frame, in order to prevent excessive correction of frequency errors of the data subcarriers using the pilot subcarriers on the transmitter side. At this time, the base station 200 needs to obtain information on whether the radio communication terminal 100 supports a change in the number of pilot subcarriers as described above. According to one embodiment of the present invention, the radio communication terminal 100, in initial ranging to exchange messages between the radio communication terminal 100 and the base station 200 for establishment of the radio communication, notifies the base station 200 that the terminal 100 supports the change in the number of pilot subcarriers.

Figure 5:
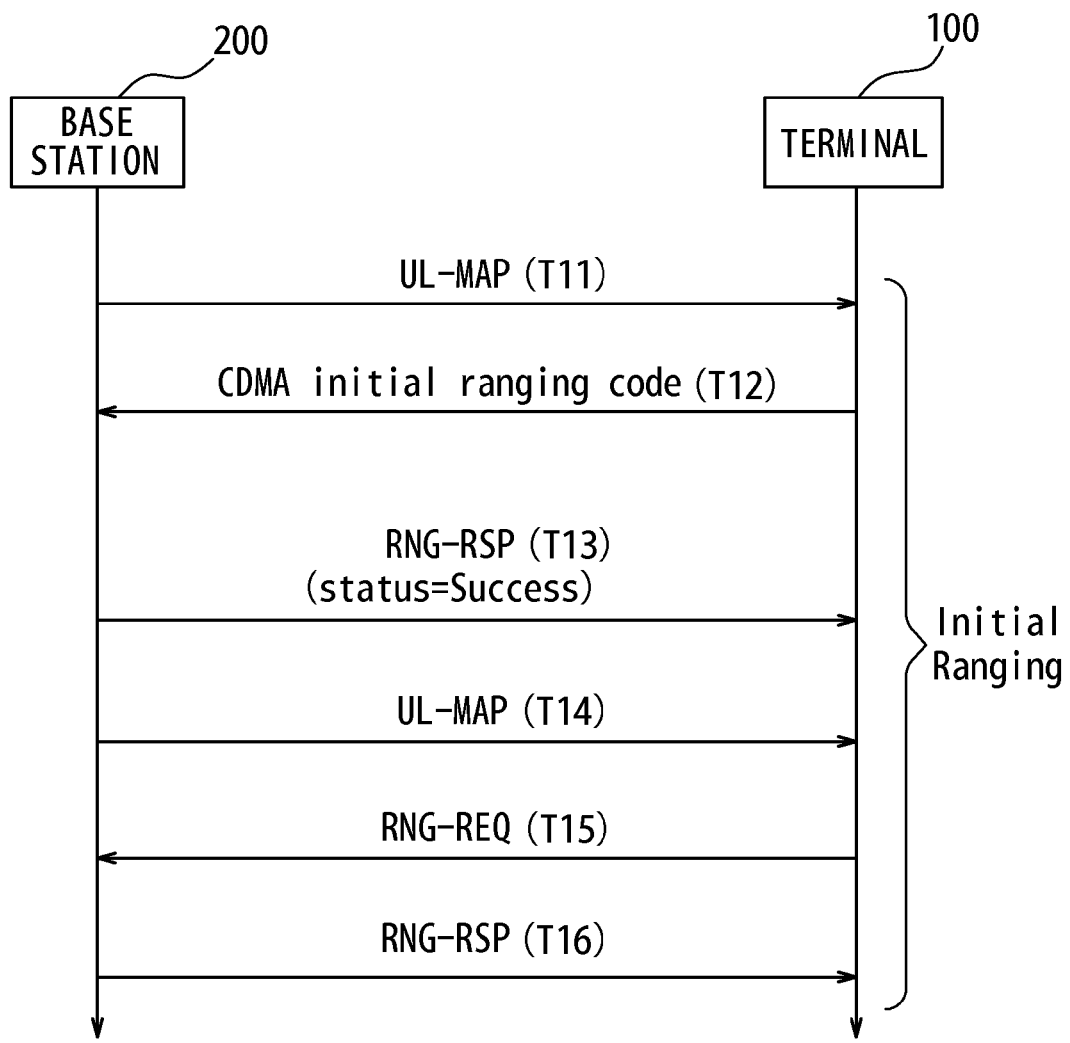
FIG. 5 is a sequence diagram illustrating initial ranging of WiMAX between a base station 200 and a radio communication terminal 100.

FIG. 5 is a sequence diagram illustrating the initial ranging of WiMAX between the base station 200 and the radio communication terminal 100. First, the base station 200 transmits UL-MAP to the radio communication terminal 100 (step T11). With reference to UL-MAP, the radio communication terminal 100 obtains information on Uplink Burst (UL Burst) allocated thereto. Next, the radio communication terminal 100 transmits a CDMA initial ranging code to the base station 200 in order to notify the base station 200 of execution of the initial ranging (step T12). Upon reception of the CDMA initial ranging code, the base station 200 transmits RNG-RSP which is a MAC message on the downlink burst (DL Burst) to the radio communication terminal 100 (step T13), and further transmits UL-MAP specifying a burst to be used by the radio communication terminal 100 to transmit RNG-REQ to the base station 200 (step T14). The radio communication terminal 100 transmits RNG-REQ to the base station 200 using the burst specified (step T15). Upon reception of RNG-REQ, the base station 200 transmits RNG-RSP to the radio communication terminal 100 (step T16). The initial ranging is completed by the above steps, and thereby communication is established between the base station 200 and the radio communication terminal 100.

Figure 7:
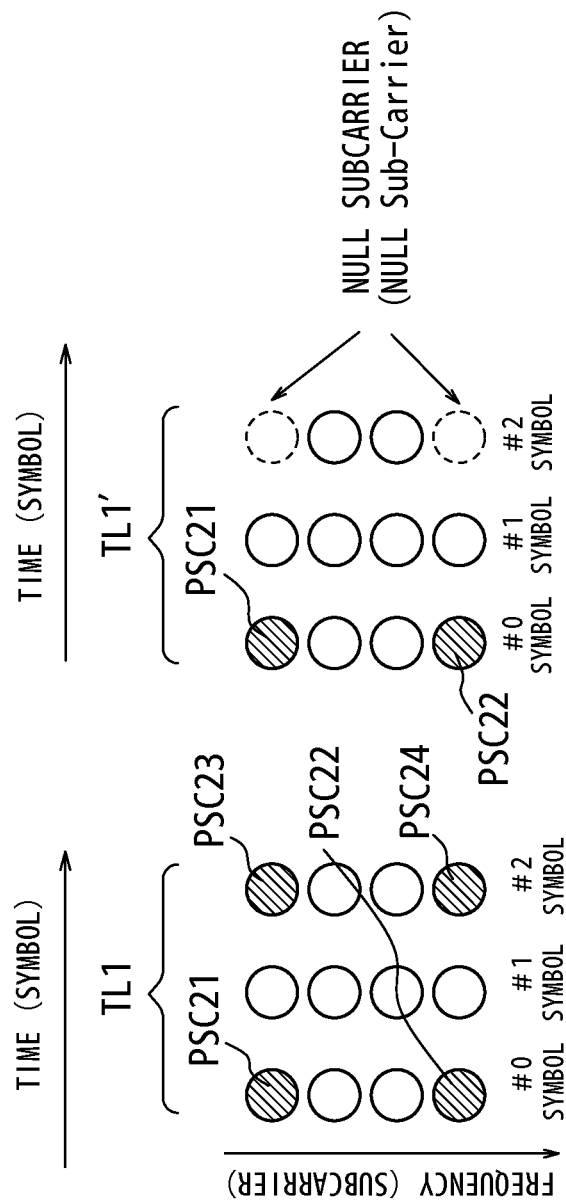
FIG. 7 is a diagram illustrating an example of structure of the tile in UL PUSC according to one embodiment of the present invention, used by the radio communication terminal 100 to inform the base station 200 of the function of the terminal itself.

When transmitting RNG-REQ to the base station 200 at step T15, the radio communication terminal 100 notifies the base station 200 of being capable of supporting the change in the number of pilot subcarriers (a function of the terminal 100), by changing the number of pilot subcarriers in the frame. FIG. 7 is a diagram illustrating an example of a tile structure according to one embodiment of the present invention, used by the radio communication terminal 100 to inform the base station 200 of the function of the terminal itself. A tile TL1 in FIG. 7 is the same as conventional tiles described with reference to FIG. 4, and two pilot subcarriers PSC 21 to PSC 24 are arranged in each of symbol #0 and symbol #2. Although only one tile is shown in FIG. 7, all of the tiles in the frame have the same arrangement of the pilot subcarriers. Here, a tile TL1' has an arrangement of the pilot subcarriers according to one embodiment of the present invention. As shown in FIG. 7, the tile TL1' replaces the pilot subcarriers in the symbol #2 of the tile TL1 with null subcarriers. The radio communication terminal 100 arranges the symbols as shown in the tile TL1', in a tile to be used in transmission of RNG-REQ to the base station 200 at step T15 in FIG. 5. Thereby, the base station 200 can recognize the function of the radio communication terminal 100 and improve communication throughput by replacing the pilot subcarriers in DL Burst to be transmitted to the radio communication terminal 100 with the data subcarriers thereafter.

Figure 8:
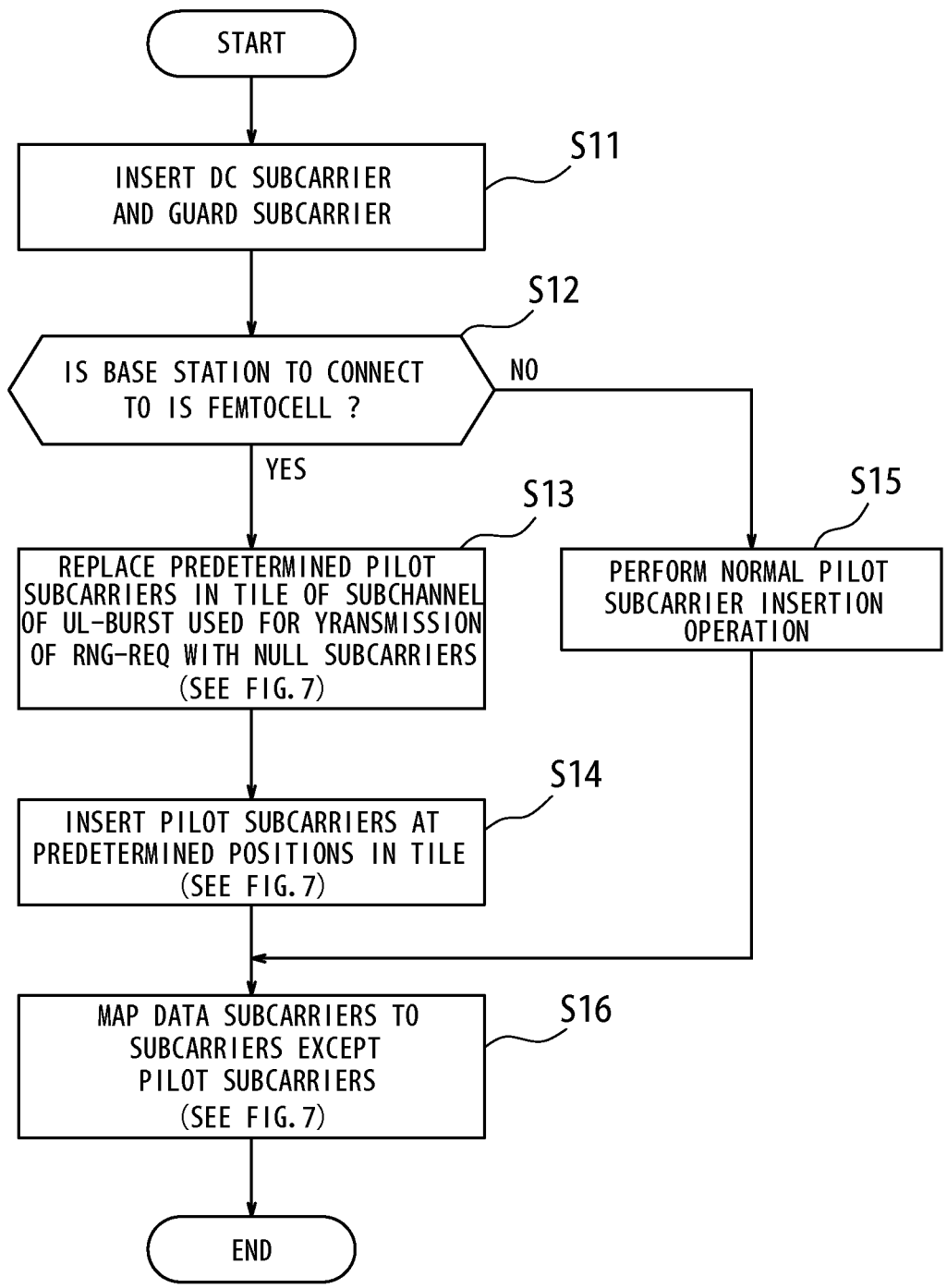
FIG. 8 is a flowchart illustrating an example of pilot subcarrier insertion processing of the radio communication terminal 100 in the initial ranging.

The above processing is described with reference to a flowchart. FIG. 8 is a flowchart illustrating an example of pilot subcarrier insertion processing of the radio communication terminal 100 in the initial ranging. The reference signal insertion unit 114 of the radio communication terminal 100 inserts the DC subcarrier and the guard subcarrier in the frame (step S11). Next, the determination unit 140 determines whether the base station 200 is the femtocell or the macrocell (step S12). As described above, such a determination is based on the cell ID included in the preamble signal received from the base station 200 or the frequency range used by the base station 200. If it is determined at step S12 that the base station 200 is not the femtocell, the reference signal insertion unit 114 inserts the pilot subcarriers at the positions shown in the normal tile TL1 in FIG. 7 (step S15). If it is determined at step S12 that the base station 200 is the femtocell, the reference signal insertion unit 114 places null subcarriers at the positions of pilot subcarriers in the tile of UL Burst to be used for transmission of RNG-REQ (step S13). Next, the reference signal insertion unit 114 inserts the pilot subcarriers at predetermined positions (positions of the standard) in the tile (step S14). After step S14 or step S15, the subcarrier allocation unit 112 allocates data subcarriers to the subcarriers except for the pilot subcarriers in the tile (step S16). The operation shown in FIG. 8 generates the tiles for the whole frame in which the predetermined pilot subcarriers are replaced with the null-carriers as shown in the tile TL1' in FIG. 7.

According to the present embodiment, as stated above, in order to inform the base station 200 that the radio communication terminal 100 supports the change in the pilot subcarriers, the positions of the pilot subcarriers are changed in the frame transmitted during the initial ranging for establishment of communication. Therefore, it eliminates the need for a change in the standard, such as by formulation of a further message to inform.

Figure 9:
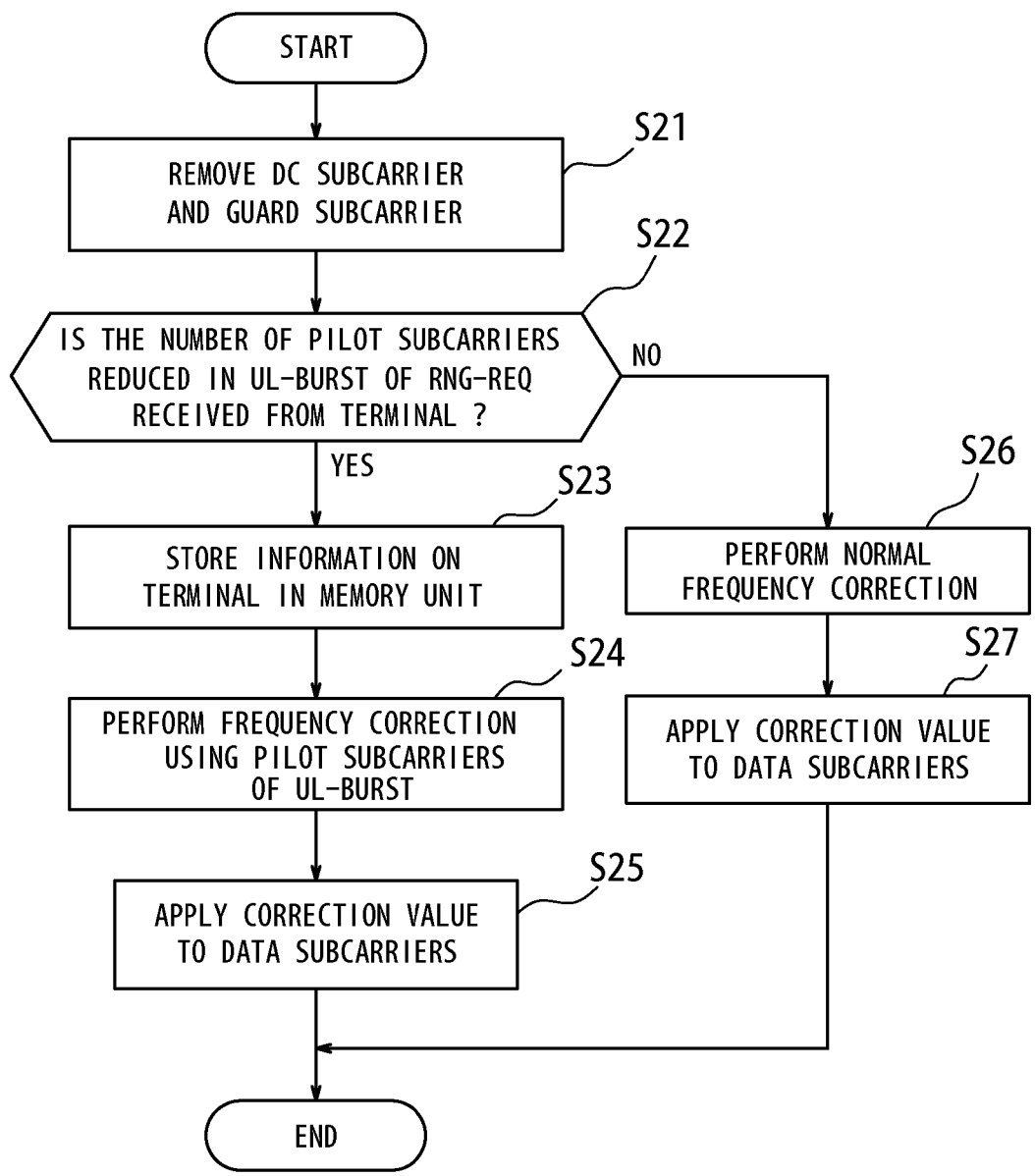
FIG. 9 is a flowchart illustrating an example of processing in a receiving operation of the base station 200 according to one embodiment of the present invention.

Next, an operation by the base station 200 upon reception of the frame having fewer pilot subcarriers as shown in the tile TL1' in FIG. 7 from the radio communication terminal 100 will be described with reference to a flowchart. FIG. 9 is a flowchart of an example of processing in a receiving operation of the base station 200 according to one embodiment of the present invention. First, the correction unit 254 of the base station 200 removes the DC subcarrier and the guard subcarrier from received data (step S21). The determination unit 240 determines whether the pilot subcarriers are reduced in UL Burst of RNQ-REQ received from the radio communication terminal 100 (step S22). If it is determined step S22 that the pilot subcarriers are not reduced, the correction unit 254 calculates the correction value in a normal manner using the pilot subcarriers included in the frame received (step S26) and applies the correction value calculated to the data subcarriers (step S27). If it is determined at step S22 that the pilot subcarriers are reduced, the received frame analysis unit 252 informs the demodulation unit 207, the error correction decoding unit 208 and the MAC layer, which are subsequent thereto, of that the radio communication terminal 100 supports the change in the number of pilot subcarriers and stores the information on the radio communication terminal 100 in the memory unit 260 (step S23). Then, the correction unit 254 calculates the correction value of the frequency response by using only the pilot subcarriers included in UL Burst, that is, the pilot subcarriers arranged in the symbol #0 in the tile TL1' shown in FIG. 7 (step S24) and applies the correction value calculated to the data subcarriers (step S25).

Figure 6:
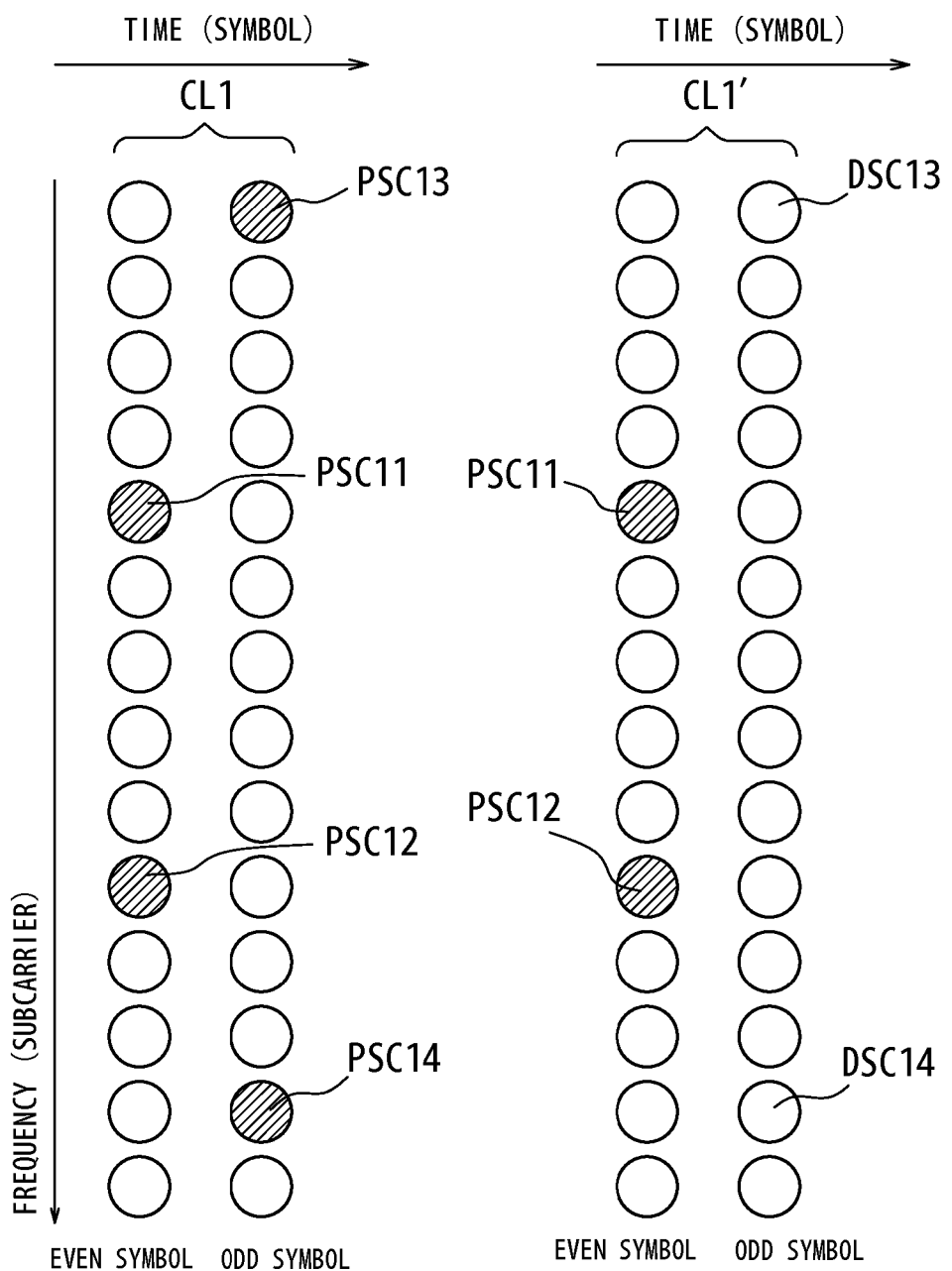
FIG. 6 is a diagram illustrating an example of structure of the cluster in DL PUSC according to one embodiment of the present invention.

Next, an operation after the initial ranging will be described. Being notified that the radio communication terminal 100 supports the change in the number of pilot subcarriers, the base station 200 performs radio communication with the radio communication terminal 100 using the transmission frame having the pilot subcarriers fewer than the standard number. This will be described with reference to the figure. FIG. 6 is a diagram illustrating an example of structure of the cluster in DL PUSC according to one embodiment of the present invention. In a cluster CL1 in FIG. 6, each of even symbol and odd symbol has two pilot subcarriers (PSC11-PSC14) arranged therein, in the same manner as the conventional clusters described with reference to FIG. 3. Although FIG. 6 shows only one cluster, the pilot subcarriers are arranged at the same positions in all of the clusters in the frame. Here, in the cluster CL1' the pilot subcarriers are arranged according to one embodiment of the present invention. In the cluster CL1', as shown in FIG. 6, two pilot subcarriers PSC13, PSC14 in the odd symbol in the cluster CL1 are replaced with data subcarriers DSC13, DSC 14. Replacing the two pilot subcarriers in the odd symbol with the data subcarriers enables improvement in a transmission speed and the communication throughput. In a WiMAX system not using a multi antenna system, for example, a theoretical maximum transmission speed is 19.44 Mbps, whereas it may achieve a maximum transmission speed at 21 Mbps when using the cluster having the data subcarriers in place of the pilot subcarriers according to the present embodiment.

Figure 10:
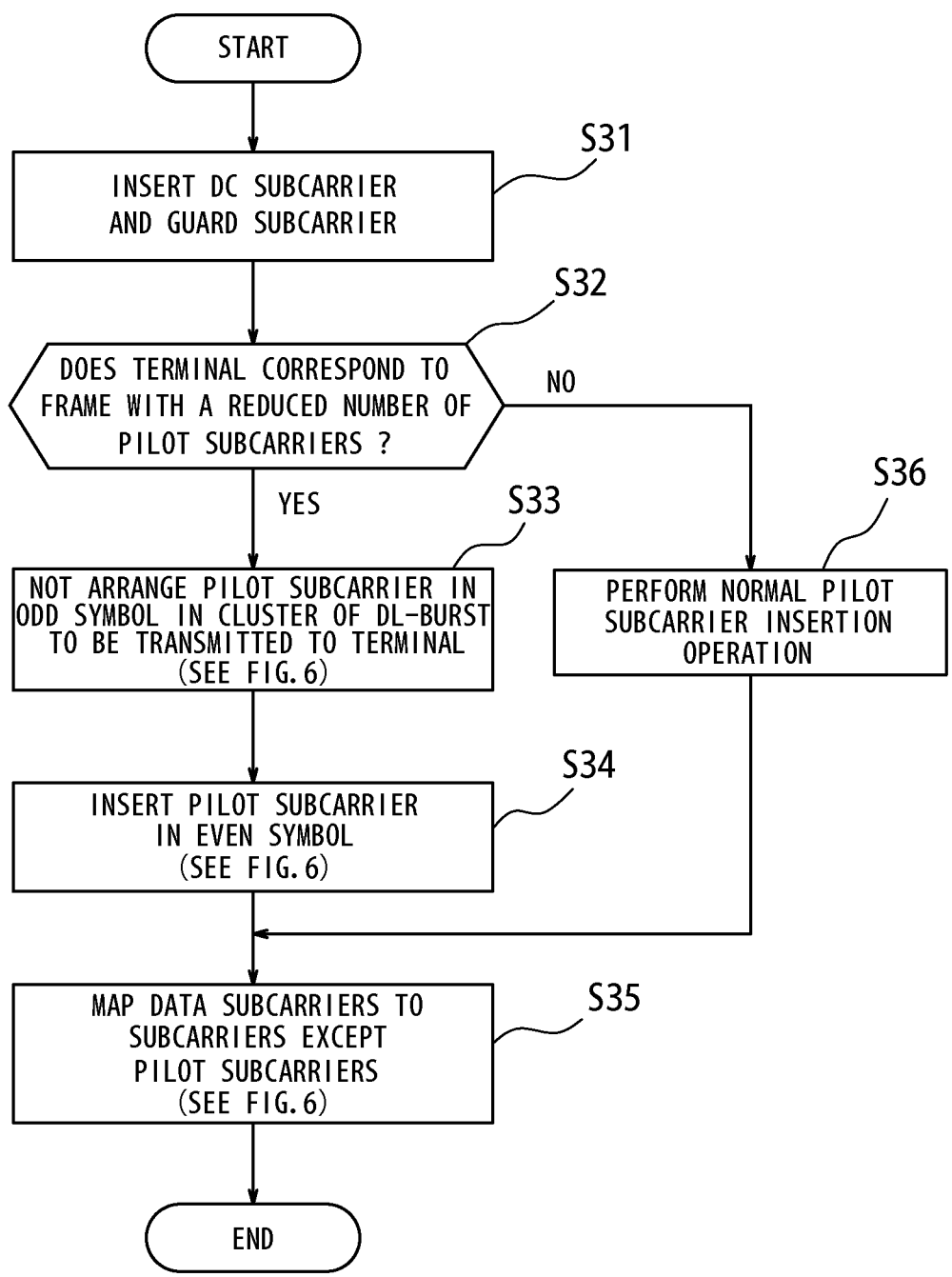
FIG. 10 is a flowchart illustrating an example of pilot subcarrier insertion processing of the base station 200 in radio communication with the radio communication terminal 100.

The above processing will be described with reference to a flowchart. FIG. 10 is a flowchart illustrating an example of pilot subcarrier insertion processing of the base station 200 in the radio communication with the radio communication terminal 100. The reference signal insertion unit 214 of the base station 200 inserts the DC subcarrier and the guard subcarrier into the frame (step S31). Next, the determination unit 240 determines whether the radio communication terminal 100 supports the frame with the reduced number of pilot subcarriers (step S32). Such a determination may be based on whether the notification signal is received from the radio communication terminal 100, that is, whether the pilot subcarriers in UL Burst of RNG-REQ received from the radio communication terminal 100 are arranged as shown in the tile TL1' in FIG. 7, for example. If it is determined at step S32 that the radio communication terminal 100 does not support the frame with the reduced number of pilot subcarriers, the reference signal insertion unit 214 inserts the pilot subcarriers at the positions in the normal cluster CL1 shown in FIG. 6 (step S36). If it is determined at step S32 that the radio communication terminal 100 supports the frame with the reduced number of pilot subcarriers, the reference signal insertion unit 214 inserts the data subcarriers DSC 13, DSC 14, in place of the pilot subcarriers in the cluster CL1' in DL Burst to be transmitted to the radio communication terminal 100, as shown in FIG. 6 (step S33). That is, the pilot subcarriers are not arranged in the odd symbols. Next, the reference signal insertion unit 114 inserts the pilot subcarriers at the predetermined positions (positions of the standard) in the cluster (step S34). That is, the pilot subcarriers are inserted into the even symbol in the example in FIG. 6. After step S34 or step S36, the subcarrier allocation unit 212 allocates the data subcarriers to the subcarriers except the pilot subcarriers in the cluster (step S35). By the processing shown in FIG. 10, the clusters for the whole frame in which the predetermined pilot subcarriers are replaced with the data subcarriers, are generated as shown in the cluster CL1' in FIG. 6.

Although the pilot subcarriers arranged in the odd symbol are replaced with the data subcarriers in the example shown in FIG. 6, the present invention is not limited thereto. For example, it is also possible to replace the pilot subcarriers in the even symbol with the data subcarriers or to replace the pilot subcarriers with the data subcarriers leaving at least one pilot subcarrier in the odd symbol or in even symbol.

Figure 11:
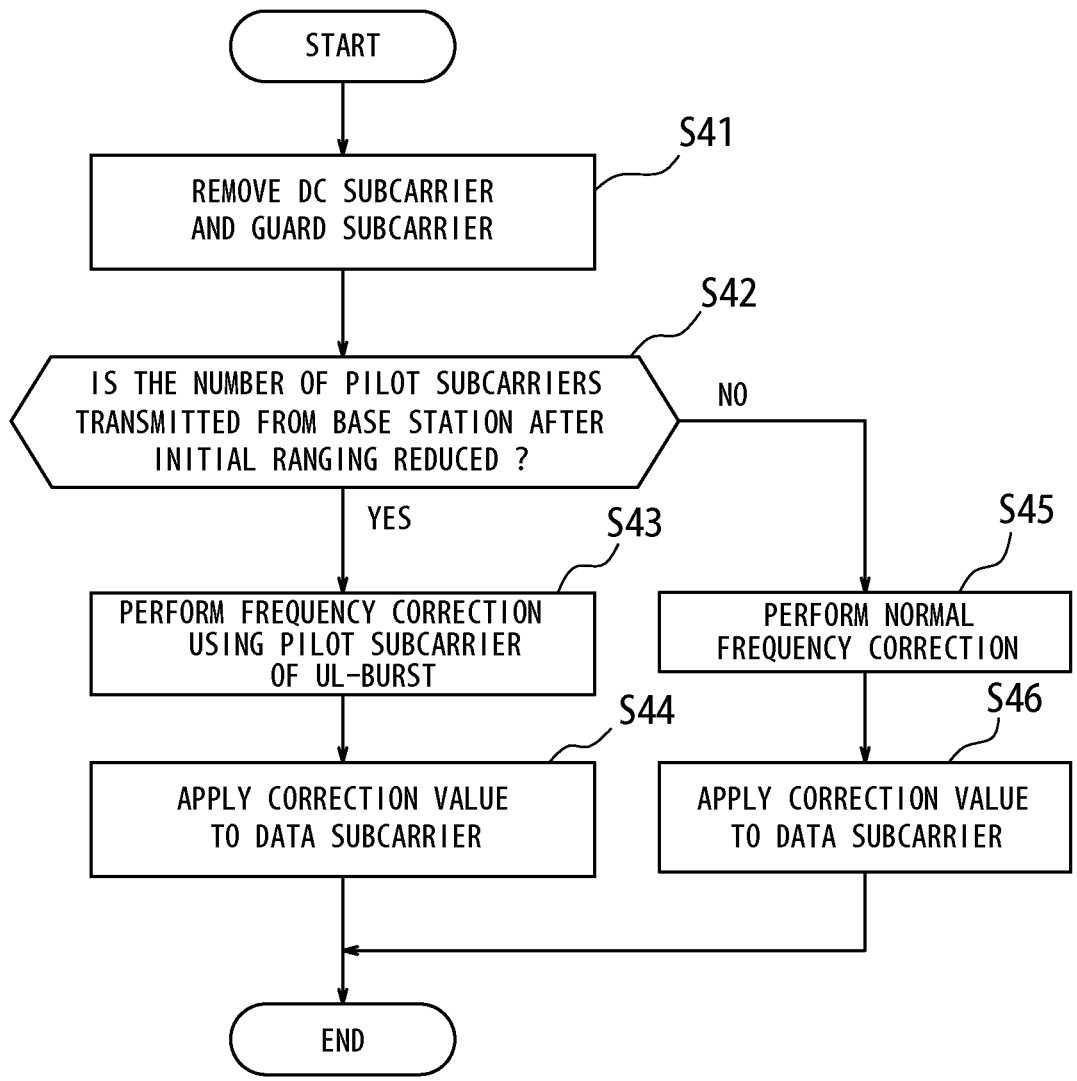
FIG. 11 is a flowchart illustrating an example of processing in a receiving operation of the radio communication terminal 100 according to one embodiment of the present invention.

Next, processing of a receiving operation of the radio communication terminal 100 will be described. FIG. 11 is a flowchart illustrating an example of processing of the receiving operation of the radio communication terminal 100 according to one embodiment of the present invention. First, the correction unit 154 of the radio communication terminal 100 removes the DC subcarrier and the guard subcarrier from the received data (step S41). The determination unit 140 determines whether the number of pilot subcarriers in the DL Burst received from the base station 200 after completion of the initial ranging is reduced (step S42). If it is determined at step S42 that the number of pilot subcarriers is not reduced, the correction unit 154 calculates the correction value in the normal manner by using the pilot subcarriers included in the frame received (step S45) and applies the correction value calculated to the data subcarriers (step S46). If it is determined at step S42 that the number of pilot subcarriers is reduced, the correction unit 254 calculates the correction value of the frequency response by using only the pilot subcarriers included in the DL Burst, that is, the pilot subcarriers arranged in the even symbol in the cluster CL1' shown in FIG. 6 (step S43) and applies the correction value calculated to the data subcarriers (step S44).

According to one embodiment of the present invention, as described above, since the frame with a reduced number of pilot subcarriers are transmitted/received, it reduces the load in correction processing using the pilot subcarriers on the receiver side. This is especially advantageous for the radio communication terminals, whose power saving have been promoted. In addition, since the data subcarrier is transmitted in place of the pilot subcarrier, it can improve the communication throughput.

In the above embodiment, the radio communication terminal 100 calculates the correction value for each cluster. However, under a good propagation environment, the correction values calculated may be approximately equal to one another for a plurality of clusters. For example, in using the base station 200 as the femtocell installed indoors, it is unusual for a user carrying the radio communication terminal 100 to move at a speed of 3 km/h or faster. Accordingly, it is considered that the frequency in the signal received by the radio communication terminal 100 does not wildly fluctuate and phase variation is kept constant. Therefore, received data vary little between adjacent clusters. In such a case, it is undesirable to calculate the correction value for each cluster, as it is an unnecessary calculation for the radio communication terminal 100. Accordingly, if the radio communication between the base station 200 and the radio communication terminal 100 is stable, the radio communication terminal 100 can apply the same correction value to a plurality of clusters. This will be described in the following with reference to figures.

Figure 12:
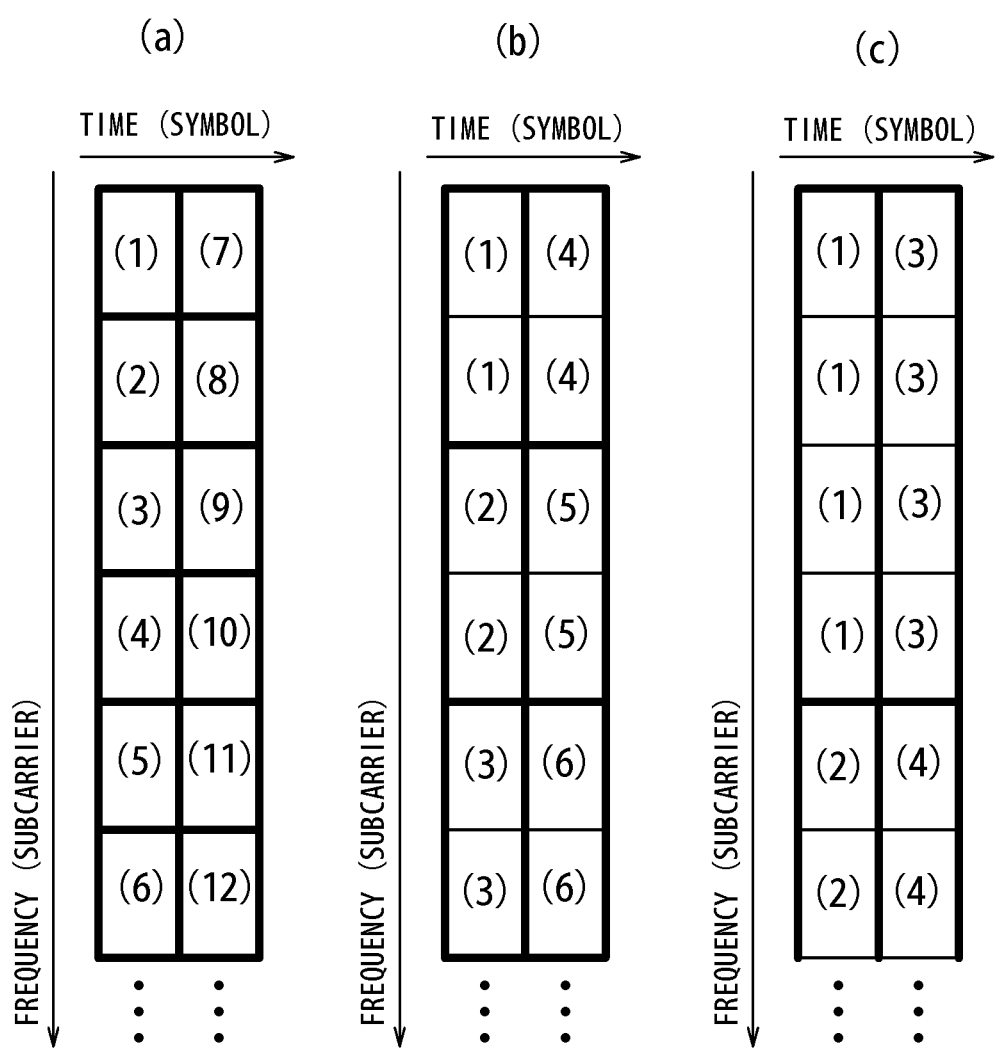
FIG. 12 shows schematic diagrams illustrating adaptation of a correction value (channel correction value) of a frequency response calculated using the pilot subcarriers in a received frame to adjacent clusters in a frequency direction.

FIG. 12 is a schematic diagram illustrating application of the correction value (channel correction value) of the frequency response calculated using the pilot subcarriers in the received frame to the clusters adjacent in a frequency direction. FIG. 12 shows a partial frame structure in which a vertical axis and a horizontal axis represent the frequency direction and a time direction, respectively. In FIG. 12, each square represents one cluster. The pilot subcarriers in each cluster in FIG. 12 can be arranged at the same positions as the above cluster CL1' shown in FIG. 6, for example, having a reduced number of pilot subcarriers. In FIG. 12, the data subcarriers in all of the clusters assigned the same number are corrected using the correction value calculated with the pilot subcarrier included in any one of the clusters.

In an example shown in FIG. 12(a), the frequencies of the data subcarriers included in each cluster are corrected using the correction value obtained by each of clusters (1) to (12). In an example shown in FIG. 12(b), correction of data subcarriers is performed for two clusters adjacent to each other in the frequency direction, that is, for each subchannel. At this time, the correction value can be calculated by using only the pilot subcarriers included in one cluster. In an example shown in FIG. 12(c), the correction value is applied to two subchannels adjacent to each other in the frequency direction.

Figure 13:
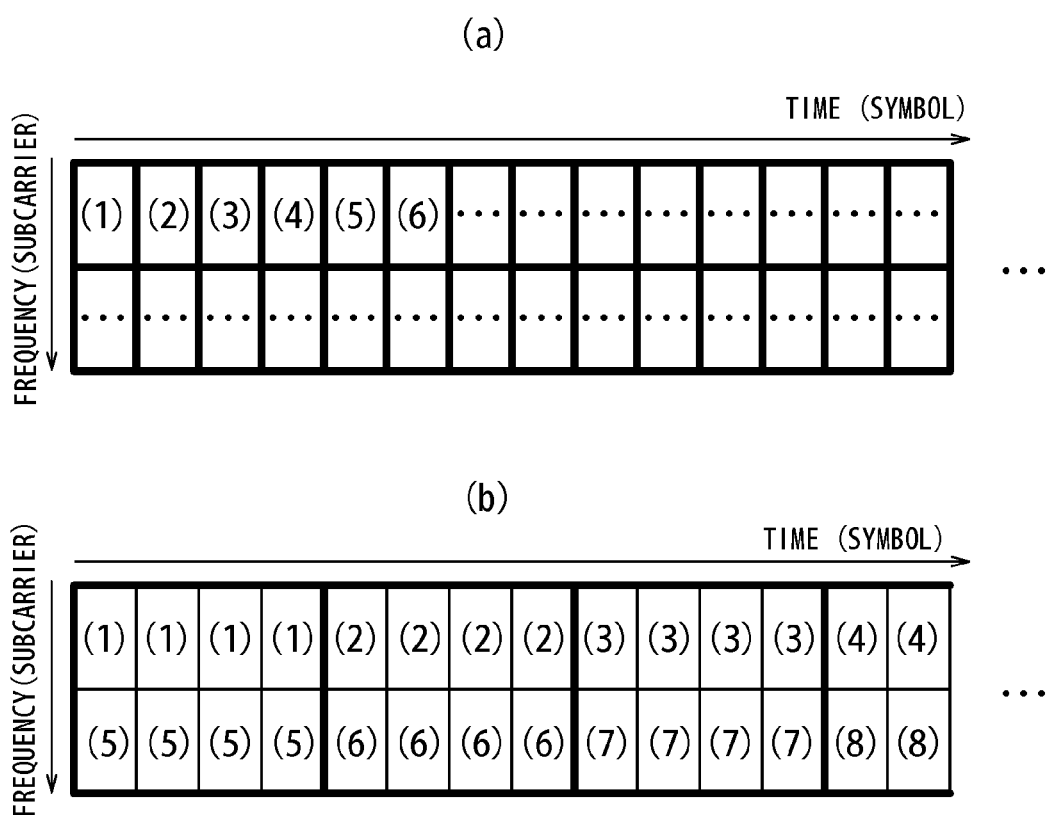
FIG. 13 shows schematic diagrams illustrating adaptation of a correction value (channel correction value) of the frequency response calculated by the pilot subcarriers in the received frame to adjacent clusters in a time direction.

Further, the base station 200 may monitor the correction values of a hundred or a thousand frames, and when determining based on the correction values that the frequency does not vary widely, expand a range to apply the correction value calculated for one cluster in the frequency direction and in the time direction. FIG. 13 is a schematic diagram illustrating a case where the correction value (channel correction value) of the frequency response calculated by using the pilot subcarriers in the received frame is applied to adjacent clusters in the time direction. FIG. 13(a) shows a state to calculate the correction value for each cluster, whereas FIG. 13(b) shows a state to calculate the correction value for four clusters adjacent to one another in the time direction. In expansion of the range to apply the correction value in the time direction as shown in FIG. 13, the correction value is calculated for each cluster in the normal manner after start of the radio communication between the base station 200 and the radio communication terminal 100 for a period of a hundred or thousand frames, for example. Then, if it is determined that the propagation environment is mild, the range (cluster) to apply the correction value is increased. It thereby reduces calculation processing of the radio communication terminal 100, diminishing the load. In comparison to a case where the correction processing is performed for all of the clusters, the processing load is reduced by ½ if correction is performed for each subchannel, ¼ if correction is performed for two subchannels, and ¹⁄₆₀ if the correction is performed to all of the subchannels in the time direction.

Figure 14:
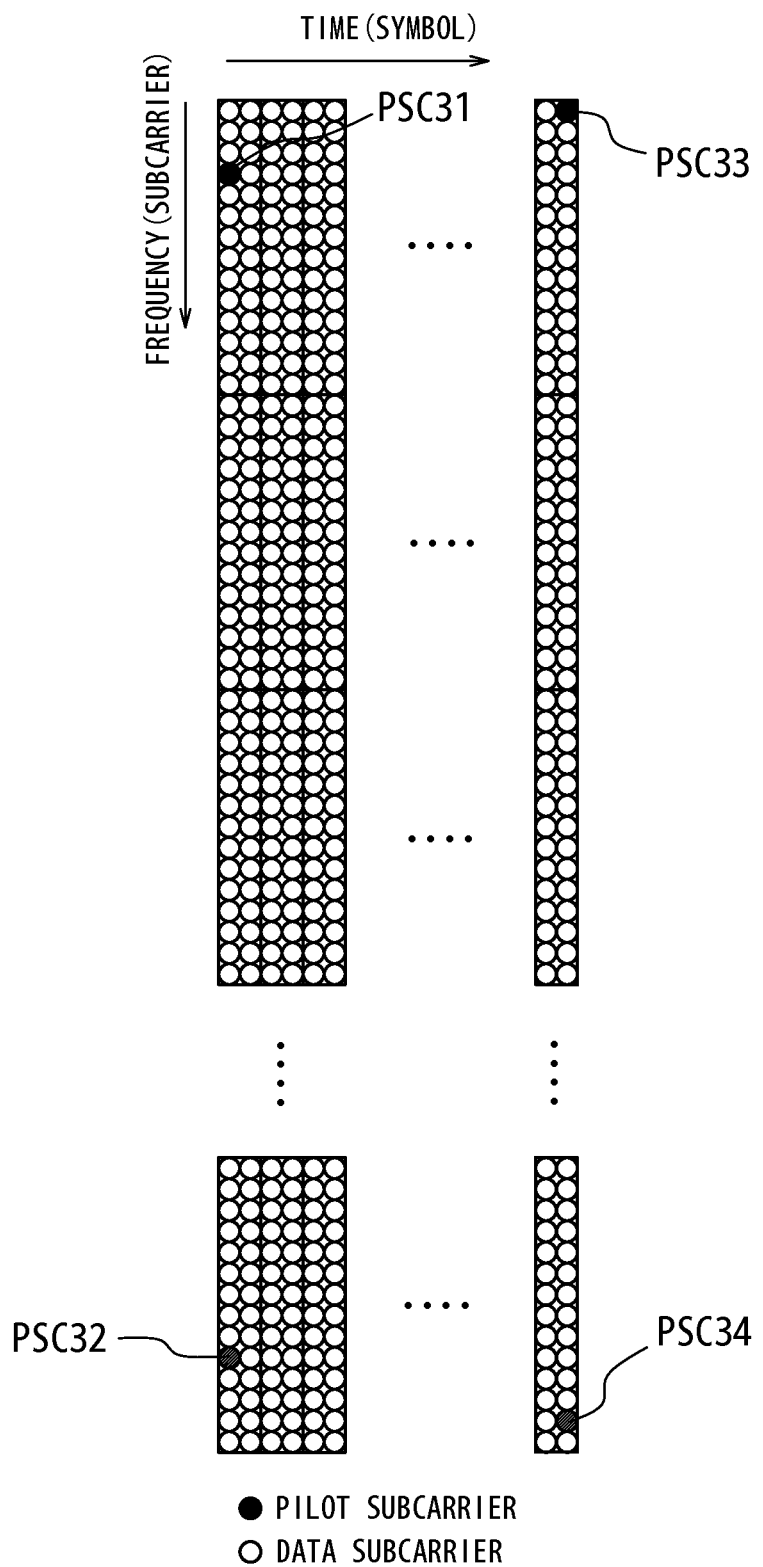
FIG. 14 is a diagram illustrating an example of arrangement of the pilot subcarriers in a data burst allocated to the radio communication terminal 100.

In addition, under a good propagation environment hardly causing a frequency variation of the received signal, such as when the base station 200 is the femtocell, it is considered to greatly reduce the number of subcarriers from a standard number thereof in order to reduce the load of calculation for correction by the radio communication terminal 100 and to improve the communication throughput. In such a case, the pilot subcarriers in the data burst allocated to the radio communication terminal 100 are arranged as shown in FIG. 14, for example. The base station 200 arranges the pilot subcarriers fewer than the standard number in the data burst allocated as shown in FIG. 14, for the radio communication terminal 100 which is connected to the base station 200 and supports the frame with a reduced number of pilot subcarriers. In an example shown in FIG. 14, pilot subcarriers are arranged at four subcarriers: a fourth subcarrier from the top and a fourth subcarrier from the last with respect to the frequency direction in the first symbol in the time direction, as well as a first subcarrier from the top and a second subcarrier from the last with respect to the frequency direction in the last symbol in the time direction.

The positions of the pilot subcarriers in DL Burst are determined based on the notification signal transmitted by the radio communication terminal 100. For example, both the base station 200 and the radio communication terminal 100 store an association of arrangement patterns of the pilot subcarriers in the notification signal transmitted by the radio communication terminal 100 in the initial ranging and arrangement patterns of the pilot subcarriers in DL Burst. This allows the radio communication terminal 100 to determine where the pilot subcarriers are arranged in DL Burst. For example, the determination unit 140 may determine the number of reference signals to be used based on a state of the radio communication between the radio communication terminal 100 and the base station 200. In addition, the base station 200 and the radio communication terminal 100 store arrangement information associating the numbers of reference signals with the arrangements of the pilot subcarriers, and thus may know the arrangement of the pilot subcarriers based on the arrangement information upon determination of the number of reference signals.

For example, it is also possible to determine the number of reference signals based on a level of a communication quality (for example, if the communication quality is represented by RSSI, its value) between the base station 200 and the radio communication terminal 100 and to transmit the notification signal including the number of reference signals determined to the base station 200.

Alternatively, the determination unit 240 may determine the number of reference signals to be used based on the state of the radio communication between the base station 200 and the radio communication terminal 100 and insert the number of reference signals determined in a signal specified by WiMAX to notify the radio communication terminal 100.

Upon reception of the data burst shown in FIG. 14, the radio communication terminal 100 corrects the frequency using four pilot subcarriers. That is, the correction value calculated using the four pilot subcarriers is applied to all of the data subcarriers in the burst. It is thus possible to reduce calculation for correction of the frequency by the radio communication terminal 100. Further, the communication throughput can be improved, as the data subcarriers are increased.

Figure 15:
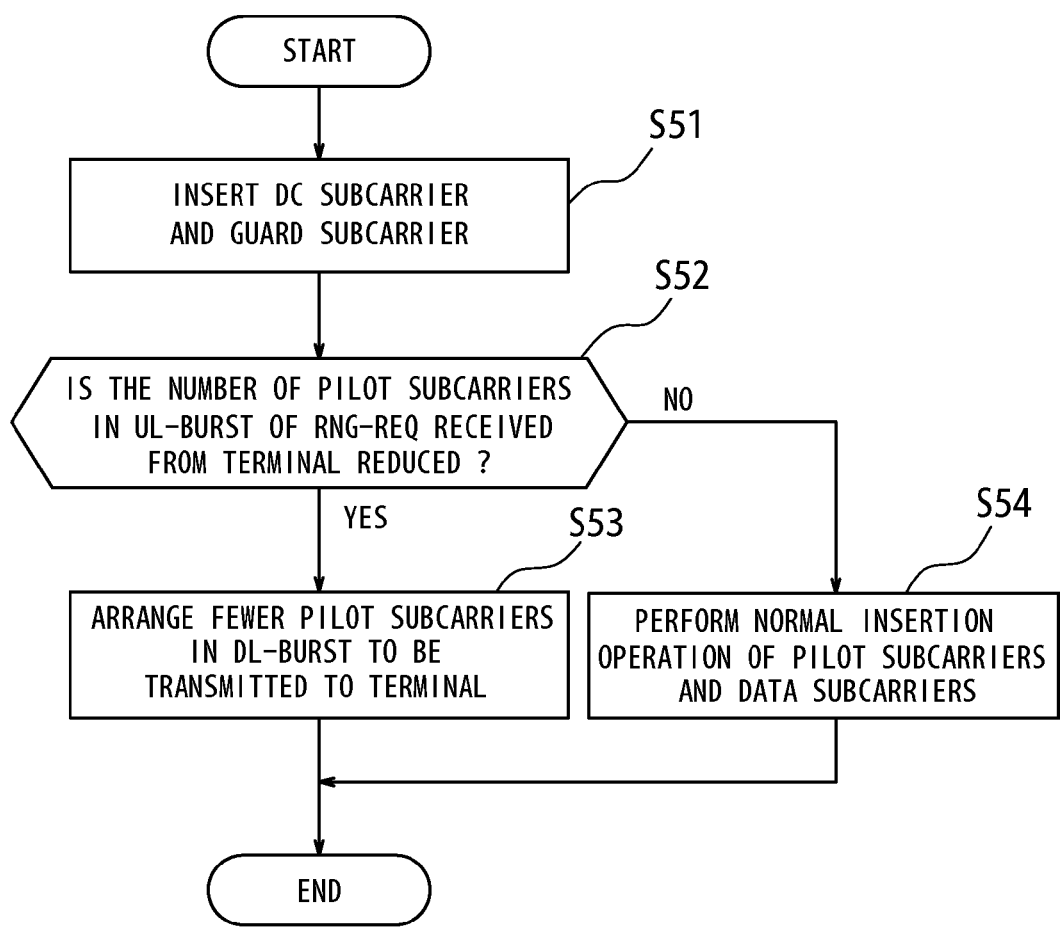
FIG. 15 is a flowchart illustrating an example of processing of the base station 200 for arranging pilot subcarriers, fewer than a normal number, in the data burst allocated to the radio communication terminal 100.

The above processing will be described with reference to a flowchart. FIG. 15 is a flowchart of an example of processing by the base station 200 to arrange the pilot subcarriers, fewer than a normal number, in allocated data burst to be transmitted to the radio communication terminal 100 which supports the frame with a reduced number of pilot subcarriers. The reference signal insertion unit 214 of the base station 200 inserts the DC subcarrier and the guard subcarrier in the frame (step S51). Next, the determination unit 240 determines whether the radio communication terminal 100 supports the frame with the reduced number of pilot subcarriers (step S52). Such a determination may be carried out based on whether the notification signal from the radio communication terminal 100 is received, that is, whether the pilot subcarriers in UL Burst of RNG-REQ received from the radio communication terminal 100 are arranged as shown in the tile TL1' in FIG. 7, for example. If it is determined at step S52 that the radio communication terminal 100 does not support the frame with the reduced number of pilot subcarriers, the reference signal insertion unit 214 inserts the pilot subcarriers as shown by the normal cluster CL1 in FIG. 6 (step S54). If it is determined at step S52 that the radio communication terminal 100 supports the frame with the reduced number of pilot subcarriers, the reference signal insertion unit 214 arranges the pilot subcarriers in DL Burst to be transmitted to the radio communication terminal 100 as shown in FIG. 14 (step S53). That is, the number of pilot subcarriers to be transmitted to the radio communication terminal 100 is reduced fewer than the standard number.

As a result of the processing shown in FIG. 15, the data burst in which the pilot subcarriers fewer than the standard number is arranged as shown in FIG. 14 is generated. When receiving DL Burst having fewer pilot subcarriers generated by the base station 200 as shown in FIG. 15, for example, the radio communication terminal 100 can determine which subcarriers are the pilot subcarriers, as the arrangement pattern of the pilot subcarriers in DL Burst is specified in the radio communication terminal 100. Accordingly, the correction unit 154 of the radio communication terminal 100 extracts four pilot subcarriers and calculates the correction value based thereon. Then, the correction unit 154 can correct the data subcarriers in the entire frame based on the correction value calculated. In the radio communication with less frequency variation such as when the base station 200 is the femtocell, a full effect of the correction can be obtained even the correction value is calculated using fewer pilot subcarriers as described above.

Now, advantages of the present invention are described once again. According to the present invention, if the propagation environment is good and thus the received signal hardly has the frequency error and the like, the number of reference signals included in the frame transmitted/received between the base station and the radio communication terminal is reduced. Thereby, the number of corrections of the frequency response on the receiver side can be reduced. Therefore, it is possible to reduce the processing load on the receiver side and, in particular, to avoid processing delay and increase in power consumption in the terminal. Further, since the data subcarriers are inserted into the frame in place of the pilot subcarriers, it can improve the communication throughput.

In an assumption using a MAC layer message, for example, in order to notify the base station of a change in positions of reference signal groups as described in Patent Document 1, it is necessary for the terminal to determine whether the number of reference signal groups is increased/reduced. As a result, it increases processing on the terminal side, possibly leading to increase in power consumption of the terminal and deterioration of the throughput due to the processing delay. Meanwhile, the present invention simply changes the positions of the reference signals in the frame to be exchanged in the initial ranging for establishment of the communication, in order to notify each other of a change in the number of reference signals in the frame or of replacement of the reference signals with the data signals. Therefore, it does not increase the processing load of the terminal and eliminates the need for formulation of a separated message.

Although the present invention is described based on the figures and the embodiment, it will be understood by those skilled in the art that variations and modifications may be implemented in a multiple manner based on disclosure of the present invention. Accordingly, all such variations and modifications are intended to be included within the scope of the present invention. For example, a function or the like of each component or each step can be rearranged avoiding a logical inconsistency, such that a plurality of methods or steps are combined or divided. In addition, the radio communication system is assumed as WiMAX in the above embodiment. However, the present invention is not limited thereto but may be applicable to other radio communication systems, such as LIE and the like, adopting OFDMA.

REFERENCE SIGNS LIST 100 radio communication terminal
200 base station
101, 201 error correction coding unit
102, 202 modulation unit
103, 203 insertion unit
104, 204 DAC
105, 205 ADC
106, 206 CP removal unit
107, 207 demodulation unit
108, 208 error correction decoding unit
110, 210 transmission frame generation unit
112, 212 subcarrier allocation unit
114, 214 reference signal insertion unit
116, 216 IFFT unit
120, 220 transmission unit
130, 230 reception unit
140, 240 determination unit
150, 250 received frame analysis unit
152, 252 subcarrier analysis unit
154, 254 correction unit
156, 256 FFT unit
260 memory unit
ANT 11, ANT 21 transmission antenna
ANT 12, ANT 22 reception antenna
PSC 11 to PSC 34 pilot subcarrier
TL1, TL1' tile
CL1, CL1' cluster
DSC13, DSC14 data subcarrier

The invention claimed is:

1. A radio communication terminal for performing radio communication with a base station by adopting Orthogonal Frequency Division Multiple Access scheme using a frame including data signals and reference signals used for correction of the data signals, comprising:
a determination unit configured to determine whether it is possible to perform good radio communication with the base station;
a transmission frame generating unit configured to generate a transmission frame having a reduced number of reference signals if it is determined that it is possible to perform good radio communication with the base station;
a transmission unit configured to transmit the transmission frame having the reduced number of reference signals as a notification signal to the base station, said notification signal being a transmission frame in which a predetermined reference signal is replaced with a null signal; and
a correction unit configured to correct the data signals included in a received frame from the base station by using the reference signals included in the received frame, wherein the determination unit determines the number of reference signals based on a state of the radio communication with the base station.

2. The radio communication terminal according to claim 1, wherein the determination unit determines whether it is possible to perform good radio communication with the base station based on a state of radio communication with the base station.

3. The radio communication terminal according to claim 1, wherein the determination unit determines whether it is possible to perform good radio communication with the base station based on a type of the base station.

4. A radio communication method for a radio communication terminal to perform radio communication with a base station by adopting Orthogonal Frequency Division Multiple Access scheme using a frame including data signals and reference signals used for correction of the data signals, comprising the steps of:
correcting the data signals included in a received frame from the base station by using the reference signals included in the received frame;
determining whether it is possible to perform good radio communication with the base station based on information included in the received frame;
generating a transmission frame having a reduced number of reference signals if it is determined that it is possible to perform good radio communication with the base station at the step of determining, said number of reference signals being based on a state of the radio communication with the base station; and
transmitting the transmission frame including the reduced number of reference signals generated at the step of generating as a notification signal to the base station, said notification signal being a transmission frame in which a predetermined reference signal is replaced with a null signal, wherein
at the step of correcting, the data signals are corrected by using the reference signals included in the received frame in which at least one reference signal is replaced with a data signal by the base station in response to the notification signal.

* * * * *